(12) United States Patent
Josiam et al.

(10) Patent No.: US 10,143,003 B2
(45) Date of Patent: Nov. 27, 2018

(54) METHODS AND APPARATUS FOR BEAMFORMING FEEDBACK IN WIRELESS SYSTEMS

(71) Applicant: Samsung Electronics Co., Ltd, Suwon-si (KR)

(72) Inventors: Kaushik M. Josiam, Fort Worth, TX (US); Rakesh Taori, McKinney, TX (US); Xiaoyi Liu, Irvine, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 67 days.

(21) Appl. No.: 15/293,230

(22) Filed: Oct. 13, 2016

(65) Prior Publication Data

US 2017/0111924 A1     Apr. 20, 2017

Related U.S. Application Data

(60) Provisional application No. 62/241,949, filed on Oct. 15, 2015, provisional application No. 62/342,664, (Continued)

(51) Int. Cl.
*H04W 4/00* (2018.01)
*H04W 72/12* (2009.01)
(Continued)

(52) U.S. Cl.
CPC ...... *H04W 72/1268* (2013.01); *H04B 7/0417* (2013.01); *H04B 7/0619* (2013.01);
(Continued)

(58) Field of Classification Search
None
See application file for complete search history.

(56) References Cited

U.S. PATENT DOCUMENTS

| 2015/0085777 A1 | 3/2015 | Seok |
| 2015/0110046 A1 | 4/2015 | Merlin et al. |

(Continued)

OTHER PUBLICATIONS

"Part 11: Wireless LAN Medium Access Control (MAC) and Physical Layer (PHY) Specifications," IEE Standard for Information Technology—Telecommunications and Information Exchange Between Systems, Local and Metropolitan Area Networks-Specific Requirements, IEEE STD 802.11, New York, Mar. 2012, 2793 pages.

(Continued)

*Primary Examiner* — Zewdu A Beyen

(57) ABSTRACT

A method, station (STA), and access point (AP) for transmitting in a WLAN. A station includes a controller and a transceiver, the transceiver configured to receive, from an AP, a channel sounding sequence including a null data packet announcement frame (NDPA) including information indicating STAs to transmit a feedback report, a null data packet (NDP) containing pilots to compute the feedback report and a trigger frame (TF) to trigger transmission of the feedback report. An AP includes a controller and a transceiver, the controller configured to generate a NDPA including information indicating STAs to transmit a feedback report, a NDP containing pilots to compute the feedback report, and a TF to trigger transmission of the feedback report from at least one of the STAs, and the transceiver is operably connected to the controller and configured to transmit a channel sounding sequence that includes the NDPA, the NDP, and the TF.

17 Claims, 11 Drawing Sheets

Related U.S. Application Data filed on May 27, 2016, provisional application No. 62/343,431, filed on May 31, 2016.

(51) Int. Cl.

| | |
|---|---|
| *H04W 24/10* | (2009.01) |
| *H04B 7/0417* | (2017.01) |
| *H04B 7/06* | (2006.01) |
| *H04W 84/12* | (2009.01) |
| *H04L 5/00* | (2006.01) |

(52) U.S. Cl.
CPC ......... *H04B 7/0645* (2013.01); *H04L 5/0057* (2013.01); *H04L 5/0085* (2013.01); *H04L 5/0091* (2013.01); *H04W 24/10* (2013.01); *H04W 72/1273* (2013.01); *H04L 5/0023* (2013.01); *H04L 5/0048* (2013.01); *H04W 84/12* (2013.01)

(56) References Cited

U.S. PATENT DOCUMENTS

| | | |
|---|---|---|
| 2015/0208436 A1 | 7/2015 | Seok |
| 2016/0143026 A1* | 5/2016 | Seok ................. H04W 72/0413 370/329 |

OTHER PUBLICATIONS

International Search Report dated Jan. 25, 2017 in connection with International Application No. PCT/KR2016/011598, 3 pages.
Written Opinion of the International Searching Authority dated Jan. 25, 2017 in connection with International Application No. PCT/KR2016/011598, 7 pages.
Young Hoon Kwon, et al., "HE NDP FRAME for Sounding", IEEE 802.11-15/1051r1, Sep. 14, 2015, 14 pages.
Chittabrata Ghosh, et al., "DL Sounding Sequence with UL MU Feedback", IEEE 802.11-15/1103r0, Sep. 14, 2015, 18 pages.

* cited by examiner

METHODS AND APPARATUS FOR BEAMFORMING FEEDBACK IN WIRELESS SYSTEMS

CROSS-REFERENCE TO RELATED APPLICATION(S) AND CLAIM OF PRIORITY

This application claims priority to U.S. Provisional Patent Application No. 62/241,949 entitled "METHODS AND APPARATUS FOR BEAMFORMING FEEDBACK IN 802.11 SYSTEMS" filed on Oct. 15, 2015; U.S. Provisional Patent Application No. 62/342,664 entitled "CHANNEL ACCESS MECHANISMS FOR FAIR AND EFFICIENT CHANNEL ACCESS IN DENSE WI-FI DEPLOYMENTS" filed on May 27, 2016; and U.S. Provisional Patent Application No. 62/343,431 entitled "CHANNEL ACCESS MECHANISMS FOR FAIR AND EFFICIENT CHANNEL ACCESS IN DENSE WI-FI DEPLOYMENTS" filed on May 31, 2016. The above-identified provisional patent applications are hereby incorporated by reference in its entirety.

TECHNICAL FIELD

This disclosure relates generally to wireless local area networks (WLANs). More specifically, this disclosure relates to frame formats for orthogonal frequency division multiple access (OFDMA) and multi-user multiple-input multiple-output (MU-MIMO) uplink feedback transmissions in packet based wireless systems, for example IEEE 802.11.

BACKGROUND

IEEE 802.11ac supported MU transmission using spatial degrees of freedom via MU multiple-input multiple-output (MIMO) in the downlink (DL) direction from the access point (AP) to the stations (STAs). To improve performance, IEEE 802.11ax is considering adding orthogonal frequency division multiple access (OFDMA) alongside MU-MIMO in the downlink as well as the uplink direction where transmission is from STAs to the AP.

SUMMARY

Embodiments of the present disclosure provide management and scheduling of UL MU transmissions for enabling beamforming feedback in WLANs.

In one embodiment, a STA for transmitting in a WLAN is provided. The STA includes a controller and a transceiver. The transceiver is configured to receive, from an AP in the WLAN, a channel sounding sequence including a null data packet announcement frame (NDPA) including information indicating STAs to transmit a feedback report and a trigger frame (TF) to trigger transmission of the feedback report. The transceiver is further configured to transmit the feedback report to the AP in response to receipt of the TF.

In another embodiment, an AP for transmitting in a WLAN is provided. The AP includes a controller and a transceiver operably connected to the controller. The controller is configured to generate a NDPA including information indicating STAs to transmit a feedback report and a TF to trigger transmission of the feedback report from at least one of the STAs. The transceiver is configured to transmit a channel sounding sequence that includes the NDPA and the TF.

In yet another embodiment, a method for operating an AP in a WLAN is provided. The method includes generating a NDPA including information indicating STAs to transmit a feedback report and a TF to trigger transmission of the feedback report from at least one of the STAs indicated in the NDPA. The method also includes transmitting a channel sounding sequence that includes the NDPA and the TF.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that downlink multi-user MIMO (DL MU-MIMO) allows an access point (AP) to simultaneously transmit independent data streams to multiple stations (STAs). The primary advantage of DL MU-MIMO is that STAs with limited capability will not degrade the overall network throughput by occupying too much time on air due to their relatively low data rates. MIMO and especially DL MU-MIMO benefit from feedback (e.g., channel sounding). Orthogonal frequency-division multiple access (OFDMA) on the downlink also facilitates simultaneous low data rate transmission to multiple STAs and also benefits from feedback, though not at the granularity used for DL MU-MIMO. Accordingly, embodiments of the present disclosure enable OFDMA and DL MU-MIMO. Specifically, embodiments of the present disclosure address the issues related to channel sounding for both OFDMA and MU-MIMO.

Figure 1:
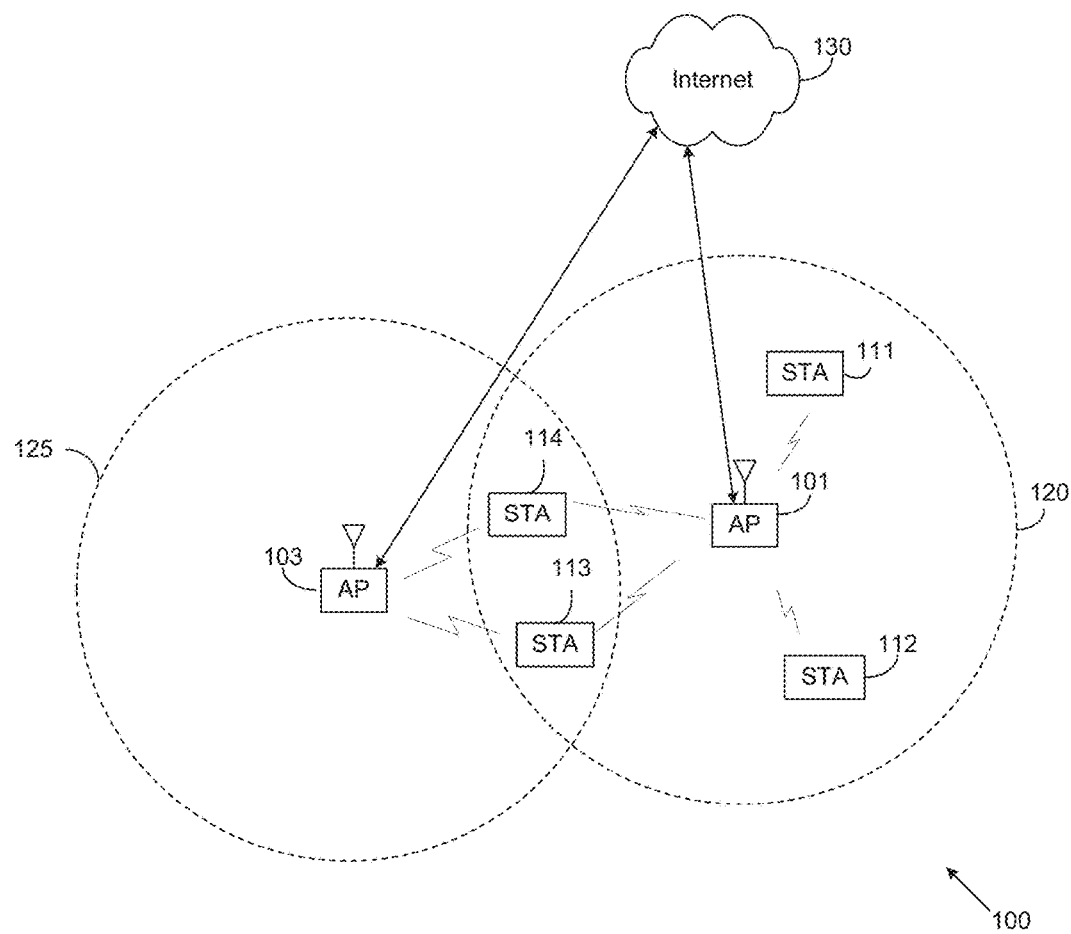
FIG. 1 illustrates an example wireless network according to illustrative embodiments of the present disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes access points (APs) 101 and 103. The APs 101 and 103 communicate with at least one network 130, such as the Internet, a proprietary Internet Protocol (IP) network, or other data network.

The AP 101 provides wireless access to the network 130 for a plurality of stations (STAs) 111-114 within a coverage area 120 of the AP 101. The APs 101-103 may communicate with each other and with the STAs 111-114 using WiFi or other WLAN communication techniques.

Depending on the network type, other well-known terms may be used instead of "access point" or "AP," such as "router" or "gateway." For the sake of convenience, the term "AP" is used in this patent document to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this patent document to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for management of MU-MIMO and OFDMA channel sounding in WLANs. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
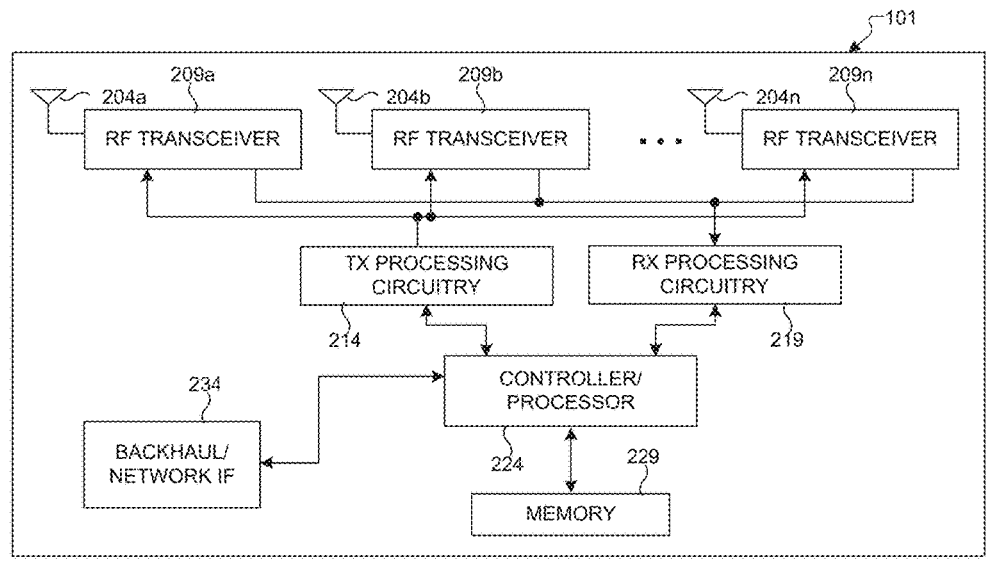
FIG. 2A illustrates an example AP according to illustrative embodiments of the present disclosure.

FIG. 2A illustrates an example AP 101 according to this disclosure. The embodiment of the AP 101 illustrated in FIG. 2A is for illustration only, and the AP 103 of FIG. 1 could have the same or similar configuration. However, APs come in a wide variety of configurations, and FIG. 2A does not limit the scope of this disclosure to any particular implementation of an AP.

As shown in FIG. 2A, the AP 101 includes multiple antennas 204a-204n, multiple RF transceivers 209a-209n, transmit (TX) processing circuitry 214, and receive (RX) processing circuitry 219. The AP 101 also includes a controller/processor 224, a memory 229, and a backhaul or network interface 234.

The RF transceivers 209a-209n receive, from the antennas 204a-204n, incoming RF signals, such as signals transmitted by STAs in the network 100. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-converts the baseband or IF signals to RF signals that are transmitted via the antennas 204a-204n.

The controller/processor 224 can include one or more processors or other processing devices that control the overall operation of the AP 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/processor 224 including a combination of DL MU-MIMO and OFDMA in the same transmit opportunity. In some embodiments, the controller/processor 224 includes at least one microprocessor or microcontroller.

The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver.

The memory 229 is coupled to the controller/processor 224. Part of the memory 229 could include a RAM, and another part of the memory 229 could include a Flash memory or other ROM.

As described in more detail below, the AP 101 may include circuitry and/or programming for management of channel sounding procedures in WLANs. Although FIG. 2A illustrates one example of AP 101, various changes may be made to FIG. 2A. For example, the AP 101 could include any number of each component shown in FIG. 2A. As a particular example, an access point could include a number of interfaces 234, and the controller/processor 224 could support routing functions to route data between different network addresses. As another particular example, while shown as including a single instance of TX processing circuitry 214 and a single instance of RX processing circuitry 219, the AP 101 could include multiple instances of each (such as one per RF transceiver). Alternatively, only one antenna and RF transceiver path may be included, such as in legacy APs. Also, various components in FIG. 2A could be combined, further subdivided, or omitted and additional components could be added according to particular needs.

Figure 2B:
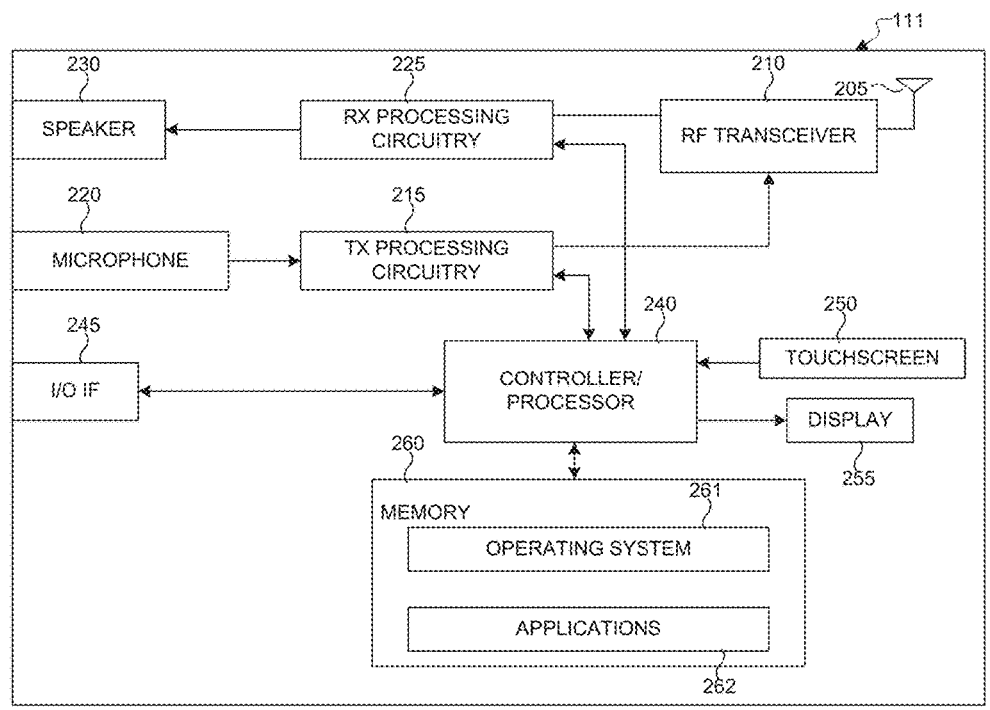
FIG. 2B illustrates an example STA according to illustrative embodiments of the present disclosure.

FIG. 2B illustrates an example STA 111 according to this disclosure. The embodiment of the STA 111 illustrated in FIG. 2B is for illustration only, and the STAs 111-115 of FIG. 1 could have the same or similar configuration. However, STAs come in a wide variety of configurations, and FIG. 2B does not limit the scope of this disclosure to any particular implementation of a STA.

As shown in FIG. 2B, the STA 111 includes antenna(s) 205, a radio frequency (RF) transceiver 210, TX processing circuitry 215, a microphone 220, and receive (RX) processing circuitry 225. The STA 111 also includes a speaker 230, a controller/processor 240, an input/output (I/O) interface (IF) 245, a touchscreen 250, a display 255, and a memory 260. The memory 260 includes an operating system (OS) 261 and one or more applications 262.

The RF transceiver 210 receives, from the antenna(s) 205, an incoming RF signal transmitted by an AP of the network 100. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205.

The controller/processor 240 can include one or more processors and execute the basic OS program 261 stored in the memory 260 in order to control the overall operation of the STA 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to provide management of channel sounding procedures in WLANs. In some embodiments, the controller/processor 240 includes at least one microprocessor or microcontroller.

The controller/processor 240 is also capable of executing other processes and programs resident in the memory 260, such as operations for management of channel sounding procedures in WLANs. The controller/processor 240 can move data into or out of the memory 260 as required by an executing process. In some embodiments, the controller/processor 240 is configured to execute a plurality of applications 262, such as applications for channel sounding, including feedback computation based on a received null data packet announcement (NDPA) and null data packet (NDP) and transmitting the beamforming feedback report in response to a trigger frame (TF). The controller/processor 240 can operate the plurality of applications 262 based on the OS program 261 or in response to a signal received from an AP. The main controller/processor 240 is also coupled to the I/O interface 245, which provides STA 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the STA 111 can use the touchscreen 250 to enter data into the STA 111. The display 255 may be a liquid crystal display, light emitting diode display, or other display capable of rendering text and/or at least limited graphics, such as from web sites.

The memory 260 is coupled to the controller/processor 240. Part of the memory 260 could include a random access memory (RAM), and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the controller/processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

Figure 3:
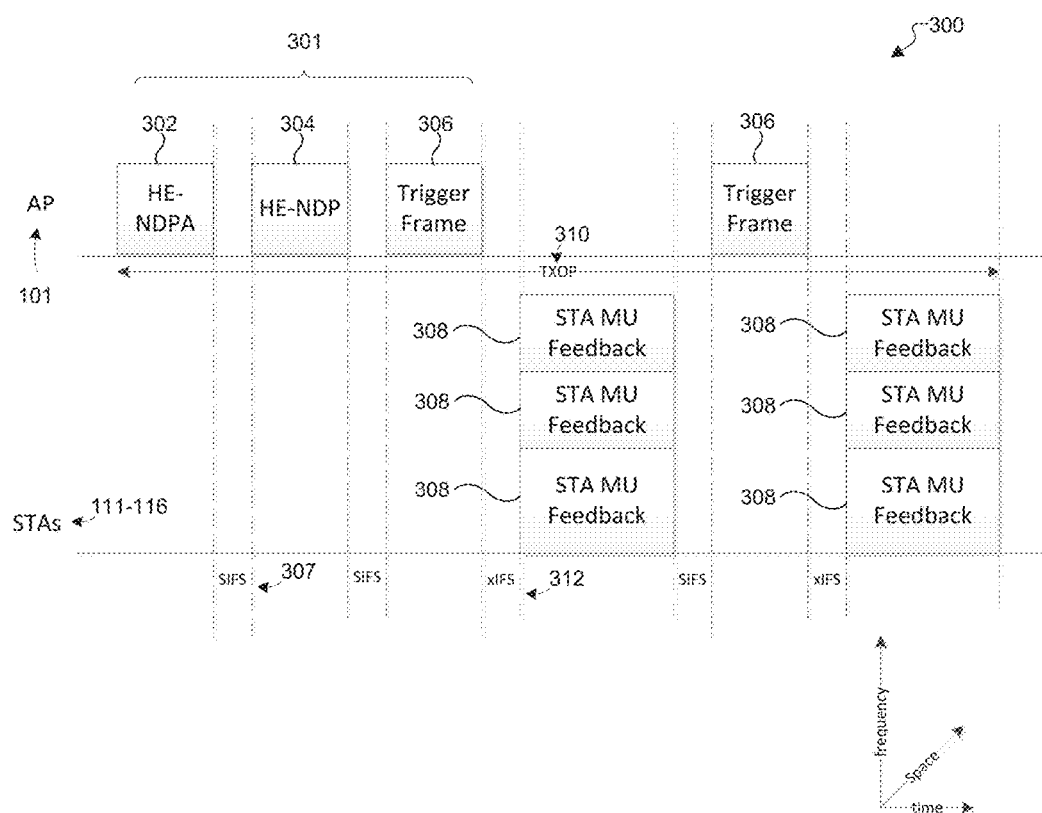
FIG. 3 illustrates a signal flowchart for management of channel sounding procedure for combined OFDMA and MU-MIMO signaling according to illustrative embodiments of this disclosure.

FIG. 3 illustrates a signal flowchart 300 for management of channel sounding procedure for combined OFDMA and MU-MIMO signaling. A channel sounding sequence 301 is transmitted from the AP 101 to the STAs 111-116. Although STAs 115-116 are not shown in FIG. 1, they may be similar to STAs 111-114. It is understood that more or fewer STAs may be present in the system. The channel sounding sequence 301 includes a high efficiency (HE) null data packet announcement frame (NDPA) 302, a HE null data packet frame (NDP) 304 and a HE Trigger Frame (TF) 306. The TF 306 may also be referred to as a beamforming report poll frame.

In an embodiment, the NDPA 302 identifies one or more STAS 111-116 that are scheduled to transmit a channel sounding feedback report. For each such identified STA, the NDPA 302 instructs the STA to perform channel estimation, i.e., to compute channel sounding feedback (which may be called a compressed beamforming report). The NDPA 302 also indicates a type of feedback report to compute and send (e.g., single user (SU) MIMO, MU-MIMO, channel quality indicator (CQI)), indicates a sub-carrier granularity Ng at which feedback is to be computed (e.g., 4 or 16) in the case of SU-MIMO or MU-MIMO, and indicates a feedback bandwidth (e.g., a number of resource units (RUs) to compute feedback over). The NDPA 302 may also include a sounding dialog token that identifies the NDPA. The sounding dialog token may be used by other frames, such as the TF 306, to indicate to STAs that the frame is referencing the NDPA 302 identified by the sounding dialog token.

In an embodiment, the NDP 304 includes pilot signals that may be used by STAs 111-116 to compute the requested channel sounding feedback. The TF 306 instructs a subset of STAs 111-116 that they are to transmit their computed channel sounding feedback information to the AP 101 in response to receipt of the TF 306. That is to say, the subset of STAS 111-116 that is identified in TF 306 are triggered to send their channel sounding feedback reports to the AP 101. The channel sounding feedback report may be a compressed beamforming feedback report and is identified in the NDPA. It may also be said that the TF 306 solicits the channel sounding feedback reports. The TF 306 also includes resource allocation (or scheduling) information for the channel sounding feedback report transmissions of the STAS 111-116. For example, the TF 306 may instruct STAs 111 and 112 that they are to transmit channel sounding feedback reports, and may include a channel resource allocation (e.g., allocated time, frequency, or space resources) for each given STA to use to make the transmission. In some embodiments, the TF 306 may allocate resources of either a UL MU-MIMO or UL OFDMA frame (e.g., resource unit, modulation and coding scheme (MCS) index, MIMO mode and spatial stream index) for use to each identified STA. In some embodiments, all channel sounding feedback reports are transmitted in a designated time slot, and only frequency and spatial resources are assigned by the TF 306.

The TF 306 may additionally include a sounding dialog token that identifies a specific NDPA 302 in order to tell the STAs that channel feedback information computed in response to the identified NDPA 302 should be transmitted. Each of the frames in the channel sounding sequence 301 may be separated by a short inter-frame spacing (SIFS) 307.

Each STA of STAs 111-116 that is identified in NDPA 302 decodes the NDPA 302 upon receipt and determines the type of feedback expected by the AP 101, as well as the sub-carrier granularity to compute SU/MU-MIMO feedback at and the feedback bandwidth. Each identified STA then uses the NDP 304 to estimate the channel and prepare the channel sounding feedback report as requested by the NDPA 302. Each STA of STAs 111-116 identified by TF 306 (which may be a different subset of STAs from that identified in NDPA 302) is triggered to send a channel feedback report transmission 308 using the channel resources indicated in the TF 306 for each identified STA. In some embodiments, the STAs may wait a period xIFS 312, which may be one SIFS 307 after receiving the TF 306, before making the channel feedback report transmission 308. Although the channel feedback report transmissions 308 are shown with only frequency differentiation in FIG. 3, it is understood that spatial differentiation may be used in their transmission as well, for example via MU-MIMO.

In some embodiments, multiple TFs 306 may be associated with the same NDPA 302, and each TF 306 may trigger a different subset of STAs from STAs 111-116 to transmit their channel feedback report transmission 308. This may be convenient when, for example, there are not enough frequency and spatial resources available for all STAs identified in the NDPA 302 to transmit a channel feedback report transmission 308 during one time period. FIG. 3 illustrates an embodiment where two TFs 306 are used to trigger channel feedback report transmissions 308 during two time periods. In some embodiments, as illustrated in FIG. 3, the channel sounding procedure may occur within one transmit opportunity (TXOP) 310.

Figure 4:
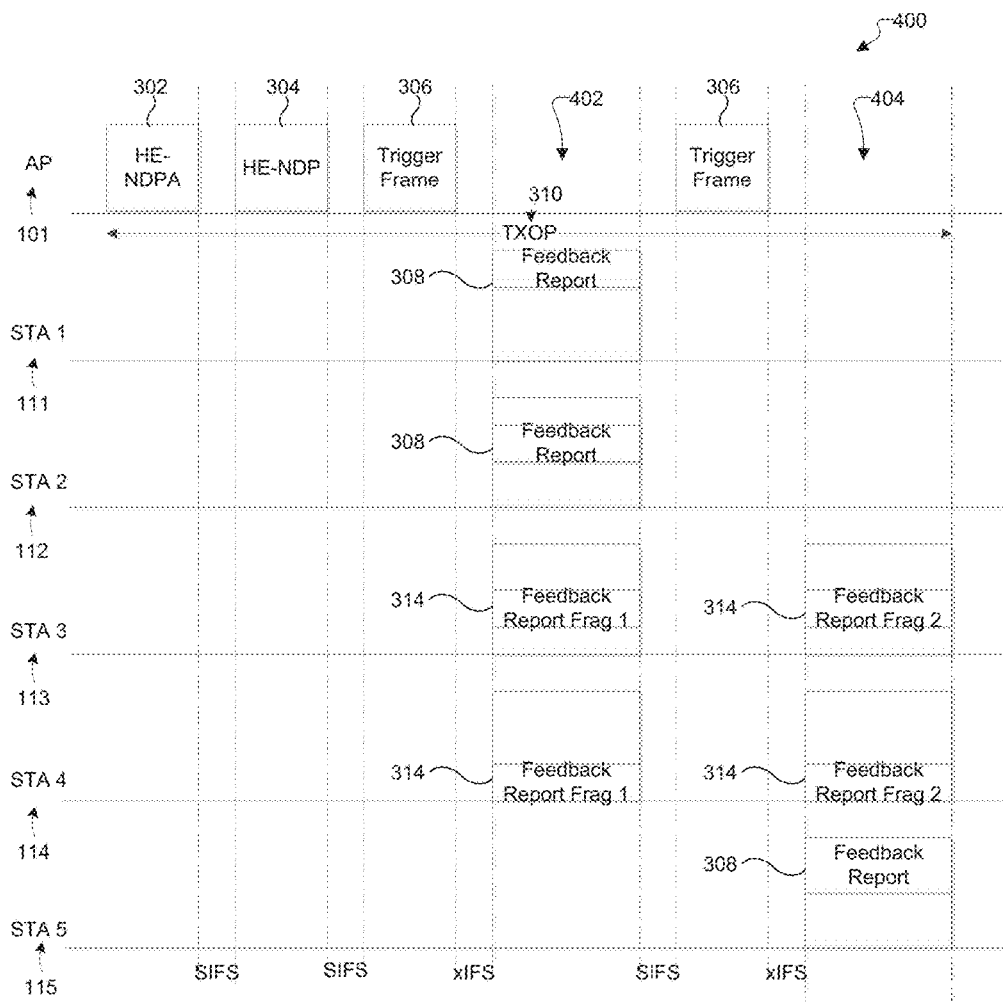
FIG. 4 illustrates a signal flowchart an embodiment of the present disclosure in which the TF instructs STAs to fragment their channel sounding feedback report into two fragments to be sent within one TXOP.
Figure 5:
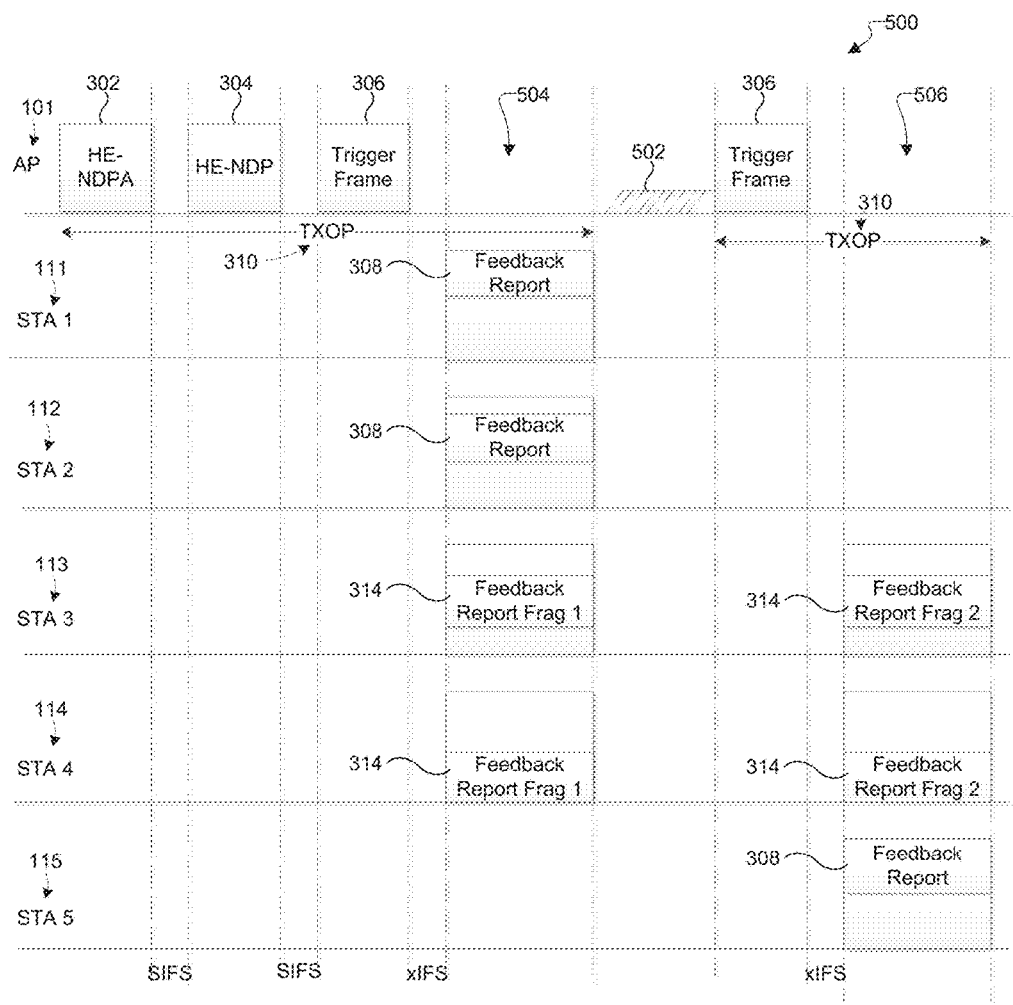
FIG. 5 illustrates a signal flowchart of an embodiment of the present disclosure in which the TF instructs STAs to fragment their channel sounding feedback report into two fragments to be sent in two different TXOPs.
Figure 6:
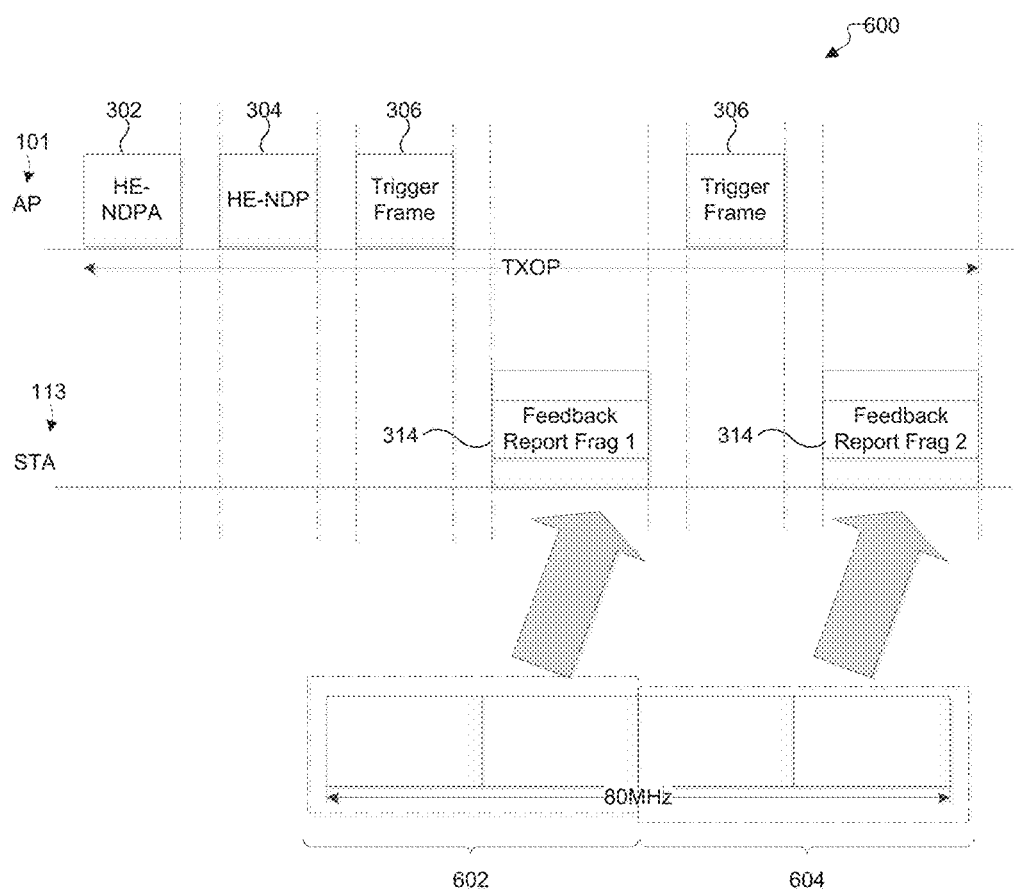
FIG. 6 illustrates a signal flowchart of an embodiment of the present disclosure in which fragmentation of the feedback report is done such that the each fragment of the feedback report is self-contained.

FIGS. 4-6 illustrate signal flowcharts of embodiments in which the TF 306 may instruct STAs to fragment their channel sounding feedback reports into two or more fragments (or portions). In some instances, the channel sounding feedback may be fragmented based on an explicit indication from the TF 306. Multiple fragments may be sent during one TXOP, or they may be spread across multiple TXOPs. Each of the multiple fragments may be sent in response to a different TF 306. The ability to split the channel sounding feedback report across multiple frames provides the scheduling flexibility at the AP 101 to multiplex different sizes of feedback reports from STAs on the UL channel in one transmission frame with minimal padding. While FIGS. 4 and 5 illustrate embodiments with two fragments, it is understood that in other embodiments the channel feedback reports may be split into any number of fragments.

FIG. 4 illustrates a signal flowchart 400 of an embodiment of the present disclosure in which multiple TFs 306 are used to schedule some STAs that fragment their channel sounding feedback report into two fragments to be sent within one TXOP 310. It is understood that in other embodiments, more than two fragments may be used. NDPA 302 identifies each of STAs 111-115 and includes instructions to conduct channel sounding, along with the channel sounding parameters, as described above. Subsequently, a first TF 306 instructs STAs 111 and 112 to transmit channel feedback report transmissions 308 (as illustrated in FIG. 3) during frame 402. The duration indicated in the first TF 306 is insufficient for STAs 113 and 114 to transmit their complete channel feedback report, and they will therefore fragment their feedback reports and send first channel feedback report fragment transmissions 314 during frame 402. A second TF 306 instructs STAs 113 and 114 to send their second channel feedback report fragment transmissions 314 during frame 404, and instructs STA 115 to send a channel feedback report transmission 308 during frame 404. Each STA is assigned different channel resources for the channel feedback report transmissions, as described above.

FIG. 5 illustrates a signal flowchart 500 of an embodiment of the present disclosure in which the TF 306 instructs STAs to fragment their channel sounding feedback report into two fragments to be sent in two different TXOPs 310. The embodiment of FIG. 5 is substantially similar to that of FIG. 4, except that a period of time 502 passes between the first TXOP 310 and a second TXOP 310. The first TF 306 instructs STAs 113 and 114 to transmit their first channel feedback report fragment transmissions 314 during the frame 504. After the period of time 502 passes, during a second TXOP 310, the second TF 306 instructs STAs 113 and 114 to transmit their second channel feedback report fragment transmissions 314 during the frame 506. In some embodiments, the TFs 306 may contain the sounding dialog token of the NDPA 302 in order to signal to the STAs that the TF 306 is soliciting feedback information that was computed in response to the NDPA 302. In other embodiments, the first TF 306 does not contain the sounding dialog token of the NDPA 302, but subsequent TFs 306 do contain the sounding dialog token.

FIG. 6 illustrates a signal flowchart 600 of an embodiment of the present disclosure in which fragmentation of the feedback report is done such that the each fragment of the feedback report is self-contained in that the AP 101 can decode the feedback report and figure out some information on the channel state. Successive fragments received from a STA in response to other TFs 306 complete the feedback report. For example, the first fragment of the feedback report can contain coarse feedback information based on some RUs or some portions of the bandwidth. In response to another TF 306, the STA can send a second fragment of the feedback report that contains refinement of the feedback information for the RUs reported in the first feedback report or feedback for other portions of the bandwidth that was not transmitted in the first feedback report.

As illustrated in FIG. 6, different feedback report fragments 314 carry feedback for different portions of an 80 MHz bandwidth. The first feedback report fragment 314 carries feedback information for the 40 MHz bandwidth portion 602 and the second feedback report fragment 314 carries feedback information for the 40 MHz bandwidth portion 604. Each feedback report is self-contained, i.e., it communicates useful feedback information which can be decoded by AP 101 for use in coordinating beamforming, OFDMA, or both. The two fragments, when combined, communicate feedback information for the full channel that the AP 101 can use to refine the channel knowledge available to the transmitter.

Figure 7:
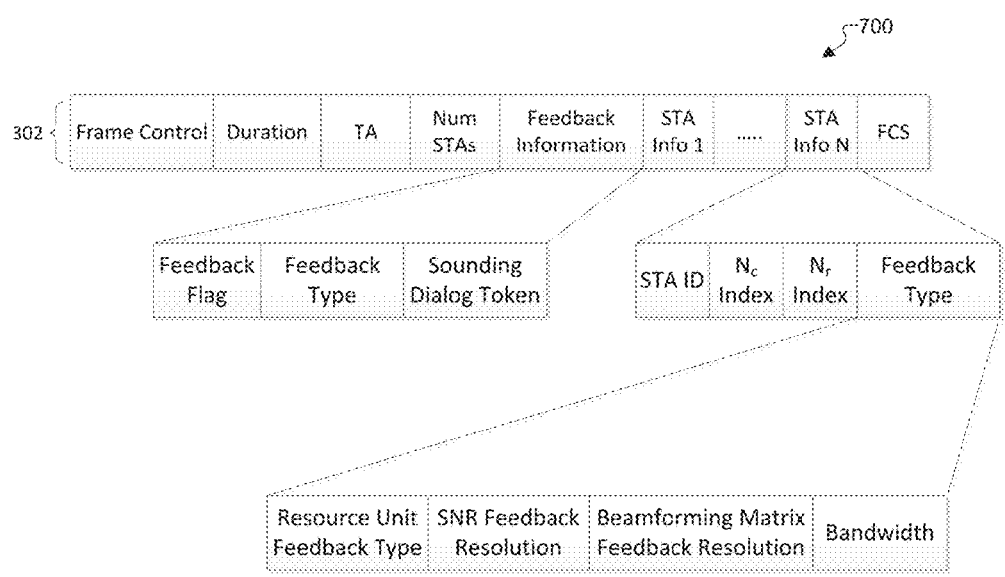
FIG. 7 illustrates an embodiment of a frame format of an HE NDPA Frame according to some embodiments of the present disclosure.

FIG. 7 illustrates an embodiment of a frame format 700 of the HE NDPA Frame 302 according to some embodiments of the present disclosure. The HE NDPA Frame 302 includes a Frame Control Field, a Duration Field, a transmitter address (TA) Field, a number of STAs (Num STAs) Field, a Feedback Information Field, a STA Info Field for each STA, and a FCS Field. The HE NDPA 302 addresses at least one STA, for example one of STAs 111-114.

The Num STAs Field lists the number of STAs addressed in the HE NDPA Frame 302. The addressed STAs are expected to listen and prepare channel sounding feedback of the type indicated in the Feedback Information Field. The Feedback Information Field consists of the following subfields: Feedback Flag, Feedback Type and Sounding Dialog Token. The Feedback Flag subfield is a one bit flag indicating whether all the involved STAs share the same Feedback Type Subfield or not. The Sounding Dialog Token subfield indicates the index of the sounding sequence in the HE NDP Frame 304, and references the NDPA 302 in subsequent trigger frames. In some cases, the HE-NDPA 302 may indicate feedback report fragmentation in the NDPA frame 302 itself. In that case, the feedback type field will carry this information for each STA.

Table 1 illustrates an example of the meaning of the bits that the Feedback Flag Subfield.

TABLE 1

| Feedback Flag | Description |
|---|---|
| 0 | Each STA follows the same feedback type requirement, which is indicated in the Feedback |

TABLE 1-continued

| Feedback Flag | Description |
| --- | --- |
| | Type Subfield in the Feedback Information Field. |
| 1 | Each STA follows the feedback type requirement indicated in the Feedback Type Subfield in the corresponding STA Info Field. The Feedback Type Subfield in the Feedback Information Field will be absent. |

The STA Info Fields 1 through N provide STA-specific information about feedback requirements. Each STA Info Field has the following subfields: STA ID, Nc Index, Nr Index, and Feedback Type. The STA ID, Nc Index and Nr Index Fields have the same meaning as the corresponding fields in the very high throughput (VHT) NDPA Frame in 802.11ac. The Feedback Type Field has the following subfields: Resource Unit Feedback Type, SNR Feedback Resolution, Beamforming Matrix Feedback Resolution, and Bandwidth.

Table 2 illustrates an example of the mapping of the bits of the Resource Unit Feedback Type field to the type of feedback expected.

TABLE 2

| Resource Unit Feedback Type | Description |
| --- | --- |
| 00 | Each involved STA sends the feedback information of the RU with the highest average SNR over all data subcarriers and all spatial streams. The feedback information includes the index of the chosen RU index, the SNR value averaged over all data subcarriers in the chosen RU for each spatial stream, and the compressed beamforming matrices (in the form of quantized angles for $\psi$ and $\phi$) in the chosen RU. |
| 01 | Each involved STA sends the feedback information for each RU in the RU arrangement indicated by the RU Allocation Field. The feedback information includes the SNR value averaged over all data subcarriers for each spatial stream for each RU, and the compressed beamforming matrices (in the form of quantized angles for $\psi$ and $\phi$) in the chosen RU. |
| 10 | SU-MIMO is used. The feedback method shall follow that in 802.11ac. |
| 11 | Reserved. |

Table 3 illustrates an example of the possible values for the SNR Feedback Resolution Field.

TABLE 3

| SNR Feedback Resolution | Description |
| --- | --- |
| 00 | Each averaged SNR value is quantized using 4-bit two's complement. |
| 01 | Each averaged SNR value is quantized using 6-bit two's complement. |
| 10 | Each averaged SNR value is quantized using 8-bit two's complement. |
| 11 | Reserved. |

Table 4 illustrates the possible values for the Beamforming Matrix Feedback Resolution Field. In another example, the Beamforming Matrix Feedback Resolution Field indicates the subcarrier resolution which should be used for feedback for the beamforming matrices.

TABLE 4

| Beamforming Matrix Feedback Resolution | Description |
| --- | --- |
| 00 | Each STA feeds back one compressed beamforming matrix (in the form of quantized angles for $\psi$ and $\phi$) for each data tone in each RU (the chosen RU when the RU Feedback Type = 00 or all the RUs when the RU Feedback Type = 01). |
| 01 | Each STA feeds back 4, 8, 16 and 35 compressed beamforming matrices (in the form of quantized angles for $\psi$ and $\phi$) for each RU. When the RU has 26 tones (24 data tones), the $\psi$ and $\phi$ for the 4 compressed beamforming matrices are quantized based on the $\psi$ and $\phi$ in the data tones with indices as 4, 10, 16 and 22, respectively. When the RU has 52 tones (48 data tones), the $\psi$ and $\phi$ for the 8 compressed beamforming matrices are quantized based on the $\psi$ and $\phi$ in the data tones with indices as 4, 10, 16, 24, 30, 36, 42 and 48 respectively. When the RU has 106 tones (102 data tones), the $\psi$ and $\phi$ for the 16 compressed beamforming matrices are quantized based on the $\psi$ and $\phi$ in the data tones with indices as 4, 10, 16, 24, 30, 36, 42, 50, 58, 64, 70, 78, 84, 90, 96 and 104, respectively. When the RU has 234 data tones, the $\psi$ and $\phi$ for the 35 compressed beamforming matrices are quantized based on the $\psi$ and $\phi$ in the data tones with indices as 4, 10, 16, 24, 30, 36, 42, 50, 58, 64, 70, 78, 84, 90, 96, 104, 110, 116, 121, 127, 133, 141, 147, 153, 159, 167, 175, 181, 187, 195, 201, 207, 213, 221 and 227, respectively. |
| 10 | Each STA feeds back 2, 4, 8 and 17 compressed beamforming matrices (in the form of quantized angles for $\psi$ and $\phi$) for each RU. When the RU has 26 tones (24 data tones), the $\psi$ and $\phi$ for the 2 compressed beamforming matrices are quantized based on the $\psi$ and $\phi$ in the data tones with indices as 8 and 18, respectively. When the RU has 52 tones (48 data tones), the $\psi$ and $\phi$ for the 4 compressed beamforming matrices are quantized based on the $\psi$ and $\phi$ in the data tones with indices as 8, 18, 30 and 42 respectively. When the RU has 106 tones (102 data tones), the $\psi$ and $\phi$ for the 8 compressed beamforming matrices are quantized based on the $\psi$ and $\phi$ in the data tones with indices as 8, 18, 34, 50, 62, 72, 88 and 104, respectively. When the RU has 234 data tones, the $\psi$ and $\phi$ for the 18 compressed beamforming matrices are quantized based on the $\psi$ and $\phi$ in the data tones with indices as 8, 18, 34, 50, 62, 72, 88, 104, 114, 126, 136, 152, 168, 170, 180, 206, 222 and 230, respectively. |
| 11 | Each STA feeds back 1, 2, 4 and 9 compressed beamforming matrices (in the form of quantized angles for $\psi$ and $\phi$) for each RU. When the RU has 26 tones (24 data tones), the $\psi$ and $\phi$ for the compressed beamforming matrix is quantized based on the $\psi$ and $\phi$ in the data tones with index as 13. When the RU has 52 tones (48 data tones), the $\psi$ and $\phi$ for the 2 compressed beamforming matrices are quantized based on the $\psi$ and $\phi$ in the data tones with indices as 13 and 39, respectively. When the RU has 106 tones (102 data tones), the $\psi$ and $\phi$ for the 4 compressed beamforming matrices are quantized based on the $\psi$ and $\phi$ in |

TABLE 4-continued

| Beamforming Matrix Feedback Resolution | Description |
|---|---|
| | the data tones with indices as 13, 42, 66 and 82, respectively. When the RU has 234 data tones, the ψ and φ for the 9 compressed beamforming matrices are quantized based on the ψ and φ in the data tones with indices as 13, 39, 65, 91, 117, 143, 169, 195 and 221, respectively. |

Table 5 illustrates an example of the possible values for the Bandwidth Field. When the bandwidth is indicated as 40, 80 or 160 MHz, the operations of feedback computation are carried out at a resolution of 20 MHz. That is to say, the feedback computation operations will be repeated on each sub-band of 20 MHz within the whole bandwidth of 40, 80 or 160 MHz. In some instances, the bandwidth may be signaled by indicating the start and end resource unit locations in a bandwidth of a particular size. For example, the start and end resource units of size 26 tones in the bandwidth used by the NDPA and the NDP.

TABLE 5

| Bandwidth | Description |
|---|---|
| 00 | 20 MHz |
| 01 | 40 MHz |
| 10 | 80 MHz |
| 11 | 160 MHz |

The MCS Level Field indicates the MCS Index that the AP 101 wishes the STA to achieve. After estimating the channels from the AP 101 to itself, each STA will examine whether the MCS Index indicated in the MCS Level Field can be achieved or not. If it can be achieved, the STA will provide the desired feedback information through the STA MU-MIMO/OFDMA Frame. Otherwise, the STA will push back the current feedback information transmission. The STA will not send the feedback information until the next HE NDPA Trigger Frame arrives and the indicated MCS level can be attained.

If the Feedback Flag Subfield in the Feedback Information Field is 0, the Feedback Type subfield in the STA Info Field will be absent. Otherwise, each STA extracts information from the corresponding STA Info Field following the same order indicated in the STA ID Field in the HE NDPA Trigger Frame.

Figure 8:
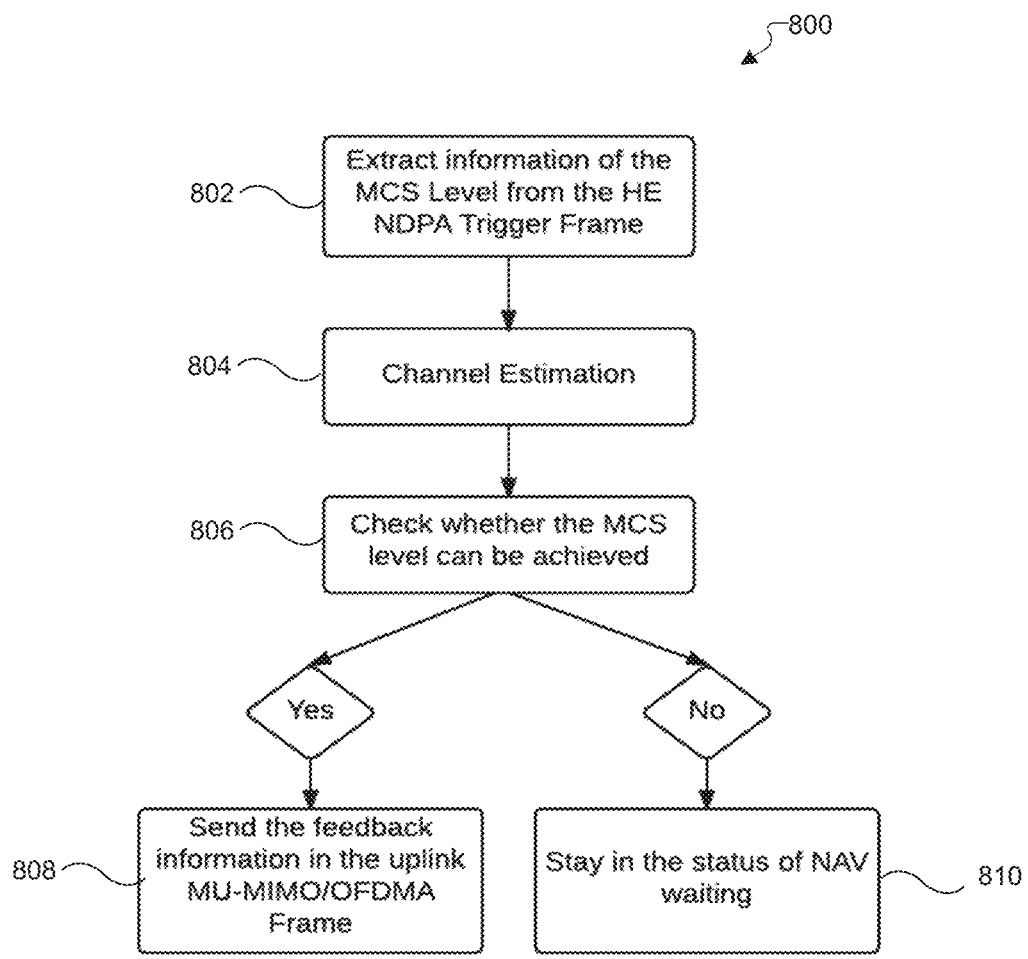
FIG. 8 illustrates a flowchart for a method of operation of a STA based on an MCS Level Subfield in the STA Info Field according to some embodiments of the present disclosure.

FIG. 8 illustrates a flowchart for a method 800 of operation of a STA based on an MCS Level Subfield in the STA Info Field. At block 802, the STA extracts information from the MCS Level Subfield from the HE NDPA Trigger Frame. At block 804 the STA performs channel estimation according to the parameters described above, as instructed by the NDPA frame. At block 806 the STA determines whether it can achieve the MCS Level extracted at block 802. If so, at block 808 the STA sends feedback information in the UL MU-MIMO/OFDMA frame. If, at block 806, the STA determines that it cannot achieve the MCS Level extracted at block 802, then at block 810 the STA stays in a network allocation vector (NAV) waiting status.

The frame format of the HE Trigger Frame in the STA uplink MU-MIMO/OFDMA feedback transmission may be similar to the trigger frame that triggers UL MU transmission, containing an identifier that clearly identifies that this trigger frame is for feedback transmission. That is to say, the trigger frame specifies the resource allocation for each STA, including the MCS and other information that the STA needs to transmit on the uplink. This feedback trigger identifier can be per STA or applied to all STAs indicated in the trigger frame. The HE Trigger Frame may additionally indicate if the feedback information must be partitioned, or fragmented. A N-bit indicator indicates if the feedback report is to be fragmented into multiple fragments to be transmitted in response to multiple triggers. A zero value for the N-bit transmission indicates no fragmentation. A non-zero value indicates the number of fragmentation portions. For example, if N=2, binary value 01 indicates two fragments, binary value 10 indicates 4 fragments, and binary value 11 is reserved.

Figure 9:
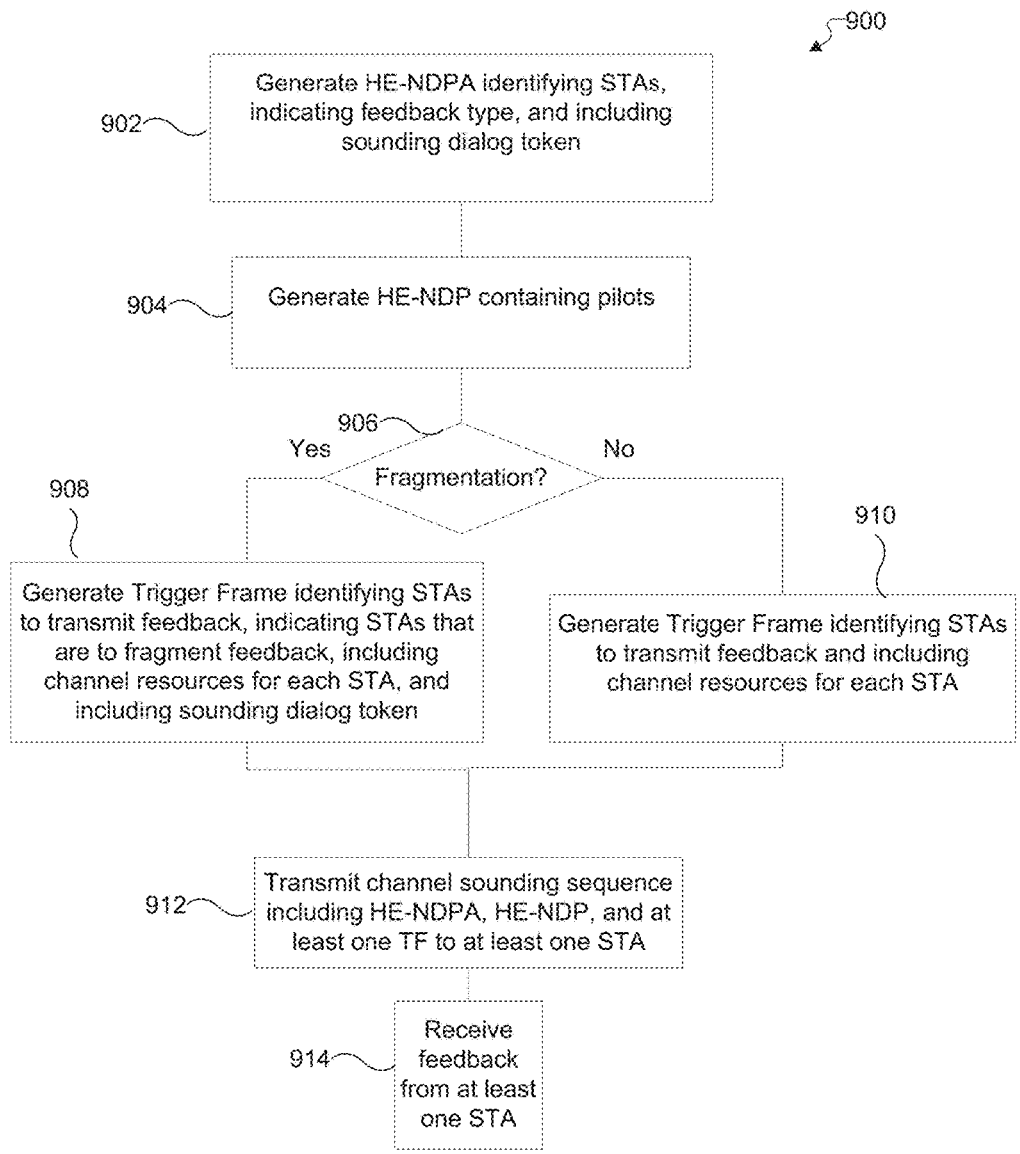
FIG. 9 illustrates a flowchart for a method of operation of an AP for initiating channel sounding procedures according to some embodiments of the present disclosure.

FIG. 9 illustrates a flowchart of a method 900 of operation of an AP for initiating channel sounding procedures according to embodiments of the present disclosure. In some embodiments, the controller/processor 224 may handle generation of frames and identification and derivation of channel feedback information from channel sounding feedback reports. The TX processing circuitry 214 in conjunction with the RF transceivers 209a-209n may handle transmission to STAs, and the RX processing circuitry 219 in conjunction with the RF transceivers 209a-209n may handle receipts from the STAs.

At block 902, the AP generates a HE-NDPA frame. As described above, the RE-NDPA frame may identify one or more STAs, indicate a type of feedback report for each identified STA to prepare, and include a sounding dialog token identifying the HE-NDPA frame.

At block 904, the AP generates a HE-NDP frame. As described above, the HE-NDP frame may contain pilots that can be used by STAs to compute channel sounding feedback information based on the information provided in the HE-NDPA.

At decision block 906, if fragmentation is chosen, then the method 900 moves to block 908, and the AP generates a TF. For example, in decision block 906, the AP may determine whether STAs are fragmenting channel sounding feedback reports. In another example, STAs may decide to fragment their channel sounding feedback reports and may signal to the AP their intention to do so. As described above, the TF identifies one or more STAs that are to transmit channel sounding feedback reports, indicates which STAs are to fragment their feedback reports, and assigns channel resources to each STA for transmission of their feedback report. The TF may contain a sounding dialog token that indicates which NDPA the TF is associated with so that the STAs know which feedback report or fragmented feedback report to send.

If, at decision block 906, fragmentation is not chosen, then the method 900 moves to block 910 and the AP generates a TF that, as described above, identifies one or more STAs that are to transmit channel sounding feedback reports and assigns channel resources to each STA for transmission of their feedback report. In some embodiments, the TF may contain a sounding dialog token that indicates which NDPA the TF is associated with so that the STAs know which feedback report to send.

At block 912, the AP transmits to at least one STA a channel sounding sequence that includes the HE-NDPA, HE-NDP, and at least one TF.

At block 914, the AP receives channel sounding feedback reports from the at least one STA according to the parameters contained in the HE-NDPA and the TF. The AP identifies channel state information from the channel sounding feedback reports. As described above, this feedback may be received over one or more TXOPs in one or more fragments per STA. The AP may in some embodiments combine information from multiple fragments to derive one channel sounding feedback report, and in other embodiments may derive channel sounding feedback information from each individual fragment and use information from other fragments to refine the channel sounding feedback information.

In other embodiments of the present disclosure, a STA, such as one of STAs 111-114, may have multiple means of obtaining channel resources for uplink (UL) transmissions to an AP, such as AP 101. For example, the STAs 111-114 and the AP 101 may use channel contention according to, for example, enhanced distributed channel access (EDCA) rules, which may be useful when STAs are communicating with the AP using single user (SU) means. Alternatively, the AP 101 may schedule UL transmissions for STAs 111-114, which may be useful when the STAs 111-114 are communicating with the AP 101 using MU UL means, such as MU-MIMO or OFDMA. In some embodiments, a STA may be able to switch between different means of obtaining UL channel resources.

In these embodiments, an STA 111 may use an indicator (e.g., called a "MU-Disable" indicator) to tell the AP 101 to stop scheduling the STA 111 for any UL transmissions. The STA sets the MU-Disable to False to resume scheduling by the AP. These embodiments also provide a mechanism and variants where an STA 111 that is operating in the MU-mode does not contend for the channel by itself, but waits to be scheduled by the AP 101 for data transmission. These embodiments also provide a mechanism wherein the STA 111 can autonomously exit the MU mode, if it is not scheduled for the AP 101 for a prescribed period of time (e.g., a timer based exit). In another example, the STA 111 may exit the MU-mode without necessarily waiting for any timer to expire but for other of reasons (e.g. arrival of high-QoS class traffic that needs to be served immediately, or needs to receive a packet on another interface such as Bluetooth (e.g., co-existence criteria)).

Figure 10:
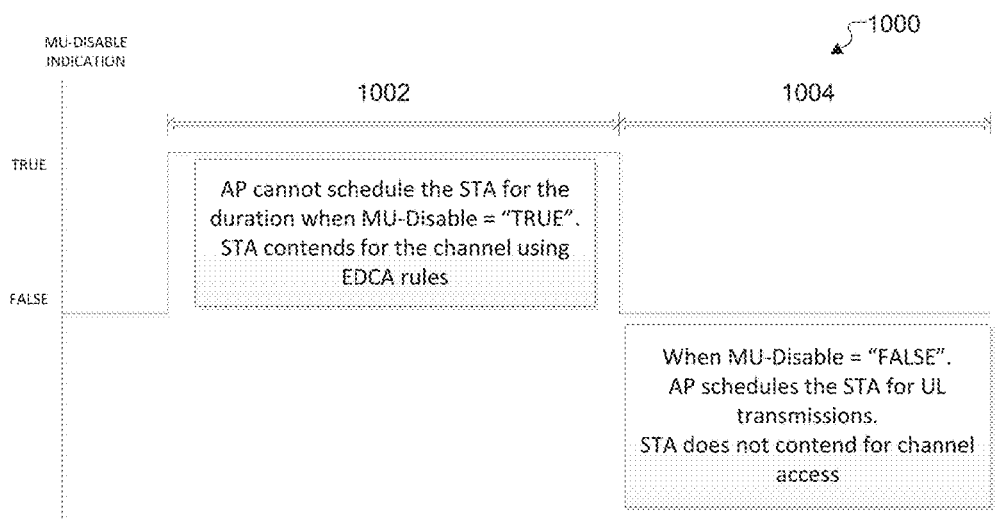
FIG. 10 illustrates a timing diagram of an MU Disable indicator or flag according to an embodiment of the present disclosure.

FIG. 10 illustrates a timing diagram 1000 of an MU Disable indicator or flag according to an embodiment of the present disclosure. A STA of STAs 111-114 attached to the AP 101 can signal to the AP 101 that it is temporarily not available to be scheduled for UL transmissions by the AP 101 by using an MU Disable indicator or flag. For example, as shown in time period 1002 of FIG. 10, setting the MU Disable indicator to True may indicate to the AP 101 that the STA is not available to be scheduled for UL transmissions. The AP may remove the STA from a list of STAs to be scheduled upon receiving the MU Disable True indicator. The STA can resume uplink scheduling by the AP (i.e., return to an MU enabled mode) by setting the MU Disable indicator to False, as shown in time period 1004.

In an embodiment, the MU Disable indicator may be carried in multi-bit elements or containers (e.g. the Receive Operation Mode Indicator element). These containers with the MU Disable flag are carried or piggybacked in data or control frames that originate from the STA. In another embodiment, the MU disable indicator may be directly carried as a bit in one of the PHY containers or preamble (e.g., the SIG-A or SIG-B fields).

Figure 11:
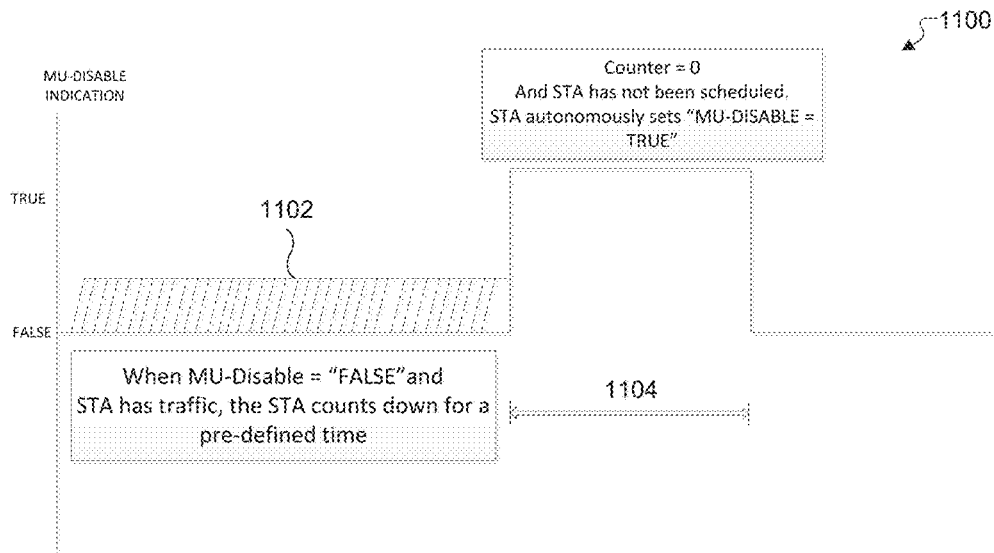
FIG. 11 illustrates a timing diagram of an MU Disable indicator or flag according to an embodiment of the present disclosure.

FIG. 11 illustrates a timing diagram 1100 of an MU Disable indicator or flag according to an embodiment of the present disclosure. When the STA operates in an MU Enabled mode and has not been granted any uplink access (i.e. has not been scheduled for UL transmission by the AP) for a certain predefined time limit (or countdown period) 1102, then the STA can autonomously drop out of MU Enabled mode operation by setting the MU Disable indicator to True, as shown in time period 1104, and can fall back to an SU mode operation (i.e., MU Disabled mode) wherein the STA contends for the channel using the usual EDCA rules.

Figure 12:
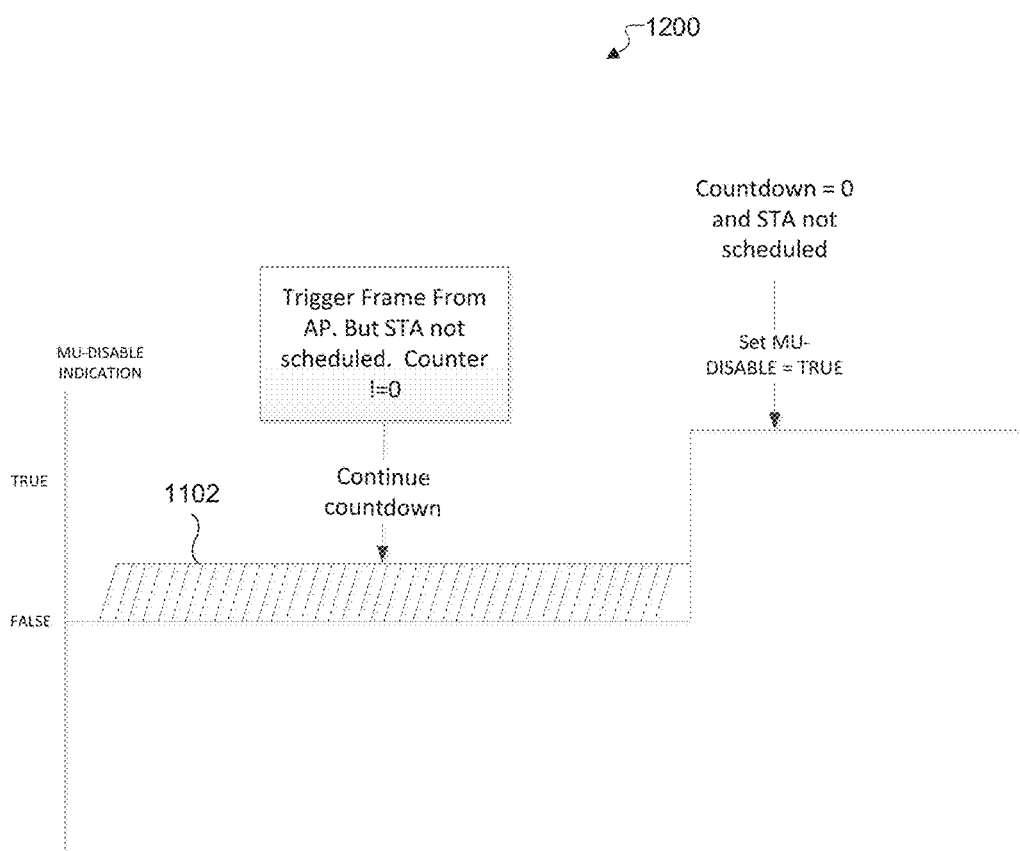
FIG. 12 illustrates a timing diagram providing an example for the countdown procedure according to an embodiment of the present disclosure.

The STA may start the countdown period 1102 any time it is in MU enabled mode and has not received a TF containing resource allocations for the STA to perform a UL transmission. FIG. 12 illustrates a timing diagram 1200 providing an example for the countdown procedure according to an embodiment of the present disclosure. As shown in FIG. 12, the STA may receive TFs containing resource allocations for other STAs but not for itself, and may continue the countdown period 1102. When the countdown period 1102 ends and the STA sets the MU Disable indicator to True, the STA may communicate this to the AP in SU mode frames. The length of countdown period 1102 may be based on a predefined fixed value or a random number drawn between 0 and a predefined value In some embodiments, if the STA receives a TF from the AP that schedules a UL transmission for the STA before the end of countdown period 1102, then the STA freezes its countdown. If the STA still has data left in queue for UL transmission to the AP after the end of its scheduled UL transmissions, it may resume countdown period 1102. If the STA empties its data queue during its scheduled UL transmissions, it may remain in MU enabled mode until more data enters the queue for UL transmission, at which point the STA may begin a new countdown period 1102.

In some embodiments where a STA has entered MU Disabled mode operation the scope of what is disabled is limited to data transmission. That is to say, the STA can still be scheduled by the AP to send acknowledgments (ACK frames) in the UL for any previously received DL data frames.

In some embodiments where a STA is in MU Enabled mode operation, the STA may decide to exit MU Enabled mode operation and contend for the channel for various reasons. That is to say, the STA does not necessarily wait for countdown timer 1102 to expire as shown in FIG. 11. The STA may do this when, for example, high-QoS class traffic that needs to be served quickly arrives, or when the STA needs to receive a packet on another interface. Upon gaining access to the channel, the STA may send a traffic frame to the AP which also carries the MU Disable indicator set to True.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A station (STA) for transmitting in a wireless local area network (WLAN), the STA comprising:
a controller; and
a transceiver configured to:
receive, from an access point (AP), a channel sounding sequence including a null data packet announcement frame (NDPA) including information indicating STAs to transmit a feedback report and information indicating that the feedback report should include an index of a selected resource unit and a signal to noise ratio (SNR) value averaged over data subcarriers in the selected resource unit for each spatial stream, a null data packet (NDP) containing pilots to compute the feedback report, and a trigger frame (TF) to trigger transmission of the feedback report; and transmit the feedback report to the AP in response to receipt of the TF.

2. The STA of claim 1, wherein the NDPA includes information indicating a type of feedback report to prepare and a sounding dialog token that identifies the NDPA.

3. The STA of claim 1, wherein the NDPA includes information indicating a bandwidth about which feedback for the feedback report is requested, the indicated bandwidth including one or more resource units.

4. The STA of claim 1, wherein the NDPA includes information indicating that the feedback report should include at least one averaged SNR value that is quantized using 6-bit two's complement.

5. The STA of claim 1, wherein:
the TF includes information indicating an MCS, duration, spatial stream, and resource units to use to transmit the feedback report,
the controller is configured to determine, from the information included in the TF, that the feedback report should be fragmented into at least first and second fragments, and
the TF includes a trigger to send the first fragment to the AP.

6. The STA of claim 5, wherein:
the transceiver is configured to receive a second TF from the AP, and
the second TF includes a trigger to send the second fragment to the AP.

7. The STA of claim 1, wherein the TF includes a sounding dialog token that identifies the NDPA and resource allocation information for sending the feedback report.

8. An access point (AP) for transmitting in a wireless local area network (WLAN), the AP comprising:
a controller configured to generate a null data packet announcement frame (NDPA) including information indicating stations (STAs) to transmit a feedback report and information indicating that the feedback report includes an index of a selected resource unit index and a signal to noise ratio (SNR) value averaged over data subcarriers in the selected resource unit index for each spatial stream, a null data packet (NDP) containing pilots to compute the feedback report, and a trigger frame (TF) to trigger transmission of the feedback report from at least one of the STAs; and
a transceiver operably connected to the controller and configured to transmit a channel sounding sequence that includes the NDPA, the NDP, and the TF.

9. The AP of claim 8, wherein the NDPA includes information indicating a type of feedback report to prepare and includes a sounding dialog token that identifies the NDPA.

10. The AP of claim 8, wherein the NDPA includes information indicating a bandwidth about which feedback for the feedback report is requested, the indicated bandwidth including one or more resource units.

11. The AP of claim 8, wherein the NDPA includes information indicating that the feedback report includes at least one averaged SNR value that is quantized using 6-bit two's complement.

12. The AP of claim 8, wherein:
the TF includes information indicating an MCS, duration, spatial stream, and resource units to use to transmit the feedback report.

13. The AP of claim 12, wherein:
the TF is a first TF,
the controller is configured to determine that the at least one STA is fragmenting its feedback report,
the controller is configured to generate a second TF to trigger transmission of a second fragment of the feedback report from the at least one STA, and
the transceiver is configured to transmit the second TF to the at least one STA in a same or different transmit opportunity (TXOP) as the first TF.

14. The AP of claim 8, wherein the TF includes a sounding dialog token that identifies the NDPA and includes resource allocation information for the feedback report from the at least one STA.

15. A method for operating an access point (AP) in a wireless local area network (WLAN), the method comprising:
generating a null data packet announcement frame (NDPA) including information indicating stations (STAs) to transmit a feedback report and information indicating that the feedback report includes an index of a selected resource unit and a signal to noise ratio (SNR) value averaged over data subcarriers in the selected resource unit for each spatial stream, a null data packet (NDP) containing pilots to compute the feedback report, and a trigger frame (TF) to trigger transmission of the feedback report from at least one of the STAs indicated in the NDPA; and
transmitting a channel sounding sequence that includes the NDPA, the NDP, and the TF.

16. The method of claim 15, wherein the NDPA includes information indicating a type of feedback report to prepare and includes a sounding dialog token that identifies the NDPA.

17. The method of claim 15, wherein the NDPA includes information indicating a bandwidth about which feedback for the feedback report is requested, the indicated bandwidth including one or more resource units.

* * * * *